United States Patent [19]

Stangroom

[11] 4,129,513

[45] * Dec. 12, 1978

[54] ELECTRIC FIELD RESPONSIVE FLUIDS

[75] Inventor: James E. Stangroom, Castleton, England

[73] Assignee: The Secretary of State for Defence in Her Britannic Majesty's Government of the United Kingdom of Great Britain and Northern Ireland, London, England

[*] Notice: The portion of the term of this patent subsequent to Jul. 5, 1994, has been disclaimed.

[21] Appl. No.: 760,977

[22] Filed: Jan. 21, 1977

Related U.S. Application Data

[63] Continuation-in-part of Ser. No. 593,494, Jul. 7, 1975, Pat. No. 4,033,892.

[30] Foreign Application Priority Data

Jul. 9, 1974 [GB] United Kingdom ............... 30456/74

[51] Int. Cl.$^2$ .............................................. C09K 3/00
[52] U.S. Cl. .................................... 252/78.1; 252/73; 252/77; 252/79
[58] Field of Search ..................... 252/75, 78.1, 77, 79, 252/74, 76, 73, 72; 301/207

[56] References Cited

U.S. PATENT DOCUMENTS

| 2,417,850 | 3/1947 | Winslow | 106/211 X |
|---|---|---|---|
| 3,047,507 | 7/1962 | Winslow | 252/74 X |
| 3,385,793 | 5/1968 | Klass et al. | 252/75 |
| 3,397,147 | 8/1968 | Martinek | 252/78.1 |
| 3,427,247 | 2/1969 | Peck | 252/75 |
| 3,970,573 | 7/1976 | Westhaver | 252/74 X |
| 3,984,339 | 10/1976 | Takeo et al. | 252/74 |
| 4,033,892 | 7/1977 | Stangroom | 252/76 |

FOREIGN PATENT DOCUMENTS

2,530,694   1/1976   Fed. Rep. of Germany.

*Primary Examiner*—Harris A. Pitlick
*Attorney, Agent, or Firm*—Stevens, Davis, Miller & Mosher

[57] ABSTRACT

In a fluid composition which is capable of exhibiting a substantial increase in apparent viscosity under the influence of an electric field and which is of the type wherein solid particles of a chemical substance are dispersed in an electrically non-conducting oleaginous vehicle, superior performance results when the chemical substance is a polymer containing acid groups, the polymer having a density not exceeding 1.8 and a specified minimum water absorbency.

12 Claims, No Drawings

ELECTRIC FIELD RESPONSIVE FLUIDS

This is a continuation-in-part application of copending application, Ser. No. 593,494, filed July 7, 1975, now U.S. Pat. No. 4,033,892 the disclosure of which is hereby incorporated by reference.

The invention relates to modifications in electroviscous fluid compositions. The co-pending application Ser. No. 593,494 describes and claims an electroviscous fluid which comprises at least one polyhydric alcohol in solid particulate form, which polyhydric alcohol contains acid groups selected from the group consisting of carboxylic acid groups and sulphuric acid groups and has a structure in which water is adsorbed, and an electrically non-conducting oleaginous vehicle in which the solid particles are dispersed.

It has now been found that a much broader range of polymeric materials can be used as the solid medium for an electroviscous fluid, the characterising feature of such polymeric materials being that they should contain acid groups. The acid groups may be of any type. Polymers which have acid groups have been found to exhibit improved performance compared to those without. This improved performance is exemplified by an increase in electroviscous effect response to upto three times compared with that of fluids using corresponding neutral solids.

Accordingly, the present invention provides an electroviscous fluid composition which comprises, in dispersion in an electrically non-conducting oleaginous vehicle, an acid group-containing-polymer having a water absorbency as herein defined and a density of not greater than 1.8, said polymer being in solid particulate form.

The required water absorbency of the polymer is such that after being allowed to equilibrate with air containing water vapour, a sample of the polymer should lose at least 8% of its weight on heating to constant weight under vacuum at a temperature which does not cause decomposition thereof and should eventually regain at least 40% of this loss in weight when exposed to air at an ambient relative humidity of about 60% and a temperature of 20° C. The heating stage is normally carried out at a temperature of about 50° to 60° C. but for many polymers higher temperatures may safely be used.

The presence of acid groups in the polymeric solid phase of the electroviscous fluid of the invention permits either the use of a lower water content in the polymer whilst maintaining a good electroviscous response, or, with the same water content as with a corresponding neutral solid, a much stronger E.V response is obtained. In the former instance, the use of lower water contents can be advantageous; for example the no-field properties of the fluids are improved, and generally current flows are lower with lower water content in the solid. Since however the acid groups themselves promote a higher current flow, the advantage of lower water content is to some extent offset in respect of this property, and in the case where water content is maintained to get a better E.V. response, this is achieved at the expense of a somewhat higher current flow than occurs with the corresponding neutral solid. Broadly speaking it will in general be necessary to design an E.V fluid to obtain an optimum performance in any given duty, and the solids of the present invention greatly increase the scope for optimization apart from providing positive inherent advantages over prior art solids, such as starch, silica or alginic acid.

The acid group or groups in the polymer may be any type, that is to say any group which is capable of increasing the hydrogen ion concentration in a medium into which the polymer is placed, but preferred acid groups are the carboxylic acid group and the sulphur containing acid groups, eg sulphate, sulphonic or sulphonous acid groups. The acid groups may be neutralized, that is to say the polymer may alternatively be in the form of a salt.

Whilst the polymer used in the electroviscous fluid of this invention may be a polyhydric alcohol as disclosed in the patent application, Ser. No. 593,494, a particularly preferred polymer is an addition polymer containing at least one monomer which has at least one acid group and/or at least one group which is convertible to an acid group after polymerization of the monomer. Exemplary of such monomers are acrylic acid, methacrylic acid, methyl acrylate and methyl methacrylate.

The polymer may comprise just one such monomer, or alternatively more than one such monomer may be co-polymerized together in any combination. In either case, these monomers may be co-polymerized with further unsaturated monomers eg olefins or other vinyl monomers, such as vinyl acetate maleic acid, maleic anhydride or N-vinyl pyrrolidone.

The polymers of the fluid composition of the invention may be prepared from ester monomers by the conventional process of suspension or emulsion polymerization in an aqueous medium, followed by hydrolysis of the ester groups. The corresponding acid group containing monomers cannot be polymerized directly by conventional processes as they are water-soluble. Since hydrolysis of the polyesters to get a polymer having acid groups is difficult to carry out requiring very vigorous conditions, an easier method of obtaining the acid group containing polymers has been sought.

Accordingly, I have devised a means of preparing the poly(acid) polymers directly from acid group-containing monomers, where these are soluble in water and where, as indicated, conventional emulsion or suspension polymerization processes cannot be applied. This novel preparative method involves suspending or emulsifying acid group-containing monomers (with co-monomers if required) in a perfluoropolyether, in which the monomers (and the resultant polymer) are insoluble, effecting polymerization of the monomers and finally separating off the insoluble polymer formed. It will be appreciated that this procedure provides a very simple and direct route to the desired poly(acid) polymers. As the polymer tends to entrain some of the perfluorinated material and in view of the considerable expense of this material, it is most advantageous to extract the polymer after filtering it off from the polymerization medium, with a material which will dissolve out the perfluorinated polyether and which can be readily separated therefrom subsequently. A particularly suitable material for this function is trichlorotrifluoroethane.

An alternative approach to carrying out either conventional polymerization of a ester monomer or direct preparation of an acid group-containing polymer according to the novel method herein described is to use radiation polymerization where this is not destructive of the material.

In general terms, it is important that the polymer to be used in the electroviscous fluid of this invention should be hydrophilic in character, since it is essential for the production of an electrovicous effect that the polymer should contain water. (It is important that the polymer should not be oleophilic in character since this will make the no-field properties of any electroviscous fluid containing the polymer very poor).

Basically it would appear that the function of the polymer is to provide the right environment for the water which must be present in an electroviscous fluid. More specifically, it seems that it may be necessary for a certain amount of water to be absorbed into sites of a given energy in the polymer. The energy produced on absorption of a water molecule into the polymer structure will be dependent on the environment in which that molecule finds itself. This relationship of water to the polymer can be viewed conveniently in terms of the hydrophilic character of the polymer. One factor affecting the absorption site energy for a polymer in a fluid of this invention will be the extent of the charge on the polymer in the vicinity of the site. The likely function of acid groups in the polymer is that by their ionization the polymer attains a negative charge with respect to water molecules adsorbed therein, and as a result when an electric field is applied to the polymer, it acts to displace the water therefrom by electro-osmosis. Hence, when the polymer comprises the solid phase of an electroviscous fluid, the shear properties of the fluid are altered by the application of an electric field. From this it will be appreciated that the number and strength of the acid groups in the polymer is important relative to both the amount of and the environment of the water present in the polymer, when designing a fluid containing that polymer to have optimum E.V. properties. It is in other words important to establish a proper balance between the water content and hydrophilic character of the polymer on the one hand and the number and strength of the acid groups in the polymer on the other.

In terms of the E.V effect which is demonstrated by a fluid containing a polymer, the effect of the water content of the polymer is as follows. The higher the water content the higher is the E.V response (change in yield point per unit voltage applied) upto a limit, the lower the threshold voltage and the higher the current flowing. Such a fluid moreover has excellent dynamic properties, i.e. it will effectively retard a system in which the fluid is already being sheared when the voltage is applied; with a fluid of lower water content this attribute of the fluid's performance is reduced, through the 'static' performance, i.e. the ability to lock together two initially stationary components, is similar to that of the higher water content fluid. High water content usually also leads to poor no-field properties. High response and low threshold are desired but a high current flow is not desirable, so that it may be appreciated that in conventional fluids the water content chosen must be a compromise value. By contrast, with the fluids of the invention, the electroviscous response can be maintained with lower water content, so improving current flow and no-field properties, or, in the other extreme, a much higher response can be achieved whilst keeping the other properties constant.

From the point of view of the structure of the polymer the balance between the acid groups and the water content and hydrophilic character of the polymer is influenced by such factors as inclusion in the polymer of nonionizing hydrophilic groups, for example pyrrolidone groups, or cross-linking of the polymer. The effect of cross-linking per se in the terms of the above discussion, is to alter the energy distribution of the water absorption sites in the polymer and the E.V response of a fluid composition containing the polymer may thus be affected by cross-linking.

Cross-linking of the polymer also has a profound effect on the no-field properties of the final fluid. It appears that if a polymer is not cross-linked, or is only slightly cross-linked, the solid will contain an appreciable amount of low molecular weight material which will be soluble in the adsorbed water and, to an extent therefore, mobile within the polymer. Such mobile material appears to be able to act to form 'bridges' between neighbouring particles in the solid polymer, even in the absence of a field and thus increases the no-field flow resistance of the fluid. Such a "flocculating" effect of mobile long chain materials is a well known phenomenon. In line with this it is found that removal of these mobile elements from the solid, when the latter is a slightly cross-linked polymer, by exhaustive washing with water, leads to greatly improved no-field properties of the final fluid. Such washing is, of course, generally impracticable with completely un-cross-linked polymers, since these will be soluble. With more completely cross-linked polymers, this problem is avoided and hence the no-field properties of fluid containing such polymers are better than for the other types of polymer.

The nature of the cross-linking agent can also be important as it may reduce the hydrophilic character of the polymer, which might be undesirable. Therefore cross-linked agents which are oleophilic in character are not particularly desirable, and if the polymer is not otherwise sufficiently hydrophilic in character should not be used. Clearly if this is the case a more hydrophilic cross-linking agent, such as diallyl ether for example, may be used instead. An alternative method of affecting cross-linking of the polymer, where this is desirable and feasible, avoids the introduction of further substances into the polymer. The alternative method is to irradiate the polymer for example using $\gamma$-radiation. Another approach may be to cause the polymer to cross-link as it is being prepared.

It will be understood by one skilled in the art without further discussion, how the hydrophilic character of a polymer may be altered to give appropriate properties for use of the polymer in an E.V fluid, and it must be stressed that the above approaches to this matter are for guidance only and are not intended to be comprehensive as to the methods which may be used.

With chemical cross-linking agents a further effect is that the density of the polymer may be affected. The density of the polymer should be matched as closely as possible with that of the oil to ensure stability of the E.V fluid dispersion. Factors affecting the attainment of density matching are discussed in detail in the parent specification Ser. No. 593,494.

In order that the polymer may be density matched with as wide a range as possible of oleaginous vehicles and as these are generally of relatively low density, it is preferable that the polymers should have as low a density as possible. For this reason a maximum density of 1.8 for the polymer is really a limit set by the availability of suitable oleaginous vehicles. In practical terms, the range of useful densities for the polymeric material is from 1.2 to 1.8.

Finally, as regards the polymers to be used in the fluids of this invention, these should be chemically stable and resistant to chemical attack or degradation by heat of light. The melting point of the polymer may be important in certain contexts of use and may dictate the choice of polymer in these cases.

In order that the present invention may be more fully understood, some examples of the practice thereof are now set out. The measurements of electroviscous fluid behaviour are carried out in the following manner.

A concentric cylinder apparatus provides for an electroviscous fluid sample to be held in the annular gap between a fixed earthed outer cylinder and a cylindrical rotor mounted within it. A field can be applied across the gap and increasing torque can be applied to the rotor, both voltage and torque being measurable. The current which flows through the fluid sample is also measured. The whole apparatus is kept at a constant temperature during testing, since the characteristic parameters of the fluid are temperature dependent, expecially the current.

As regards the significant parameters of a fluid, the 'yield-point' is taken as that value of the torque at which sustained rotation is observed. In a plot of yield point against voltage applied, the curve is basically linear in form but there is usually a threshold voltage, $V_o$, below which there is no electroviscous effect. The mechanical behaviour of an electroviscous fluid can be described by two parameters, viz, the threshold voltage $V_o$ and the slope of the linear portion of the yield-point/voltage curve, designated $S/v$.

For so-called 'dynamic' measurements, the fluid is sheared as measurements are being made and three dimensional plots must be made to relate all the variables.

To obtain further parameters which are characteristic of a given fluid, the d.c current passed by the fluid can be measured and related to the voltage applied across the working gap. The relationship of current to voltage takes the form:

Current/Unit area= $P(V) + Q(V)^2$.

This relationship tends to break down at low voltage values and this leads to negative values of P, but for all practical purposes the law is sufficiently accurate over the working range of the fluids.

The constants P and Q may be readily determined from experimental results of current and voltage by carrying out a linear regression of conductivity against voltage; the slope of the regression line gives Q and the intercept on the conductivity axis gives P.

It appears that the values of P and Q are not greatly affected by shearing of the fluid. P is virtually temperature independent, but Q has a Boltzmann-type temperature dependence.

The characteristic data are highly dependent upon the water content of the polymer and this has not been optimised in every case. Where the polymer used was in 'as made' form after drying, the water content is stated as being 'ambient water content'. In some cases further water has been added and the amount so added is stated where appropriate as a percentage by weight of the polymer weight is 'ambient water content + X%'.

For the no-field properties, a conventional cone and plate type viscometer (Haake) was used, using a 1.89° Cone. The solids were in 30% v/v suspensions in Aroclor and measurements of yield point and plastic viscosity of the suspensions were made at 30° C.

EXAMPLE 1

A sample of polyacrylic acid cross-linked with divinyl benzene was prepared as follows.

142.5 ml of methyl acrylate was taken and freed from stabilizer by by washing with dilute alkali in a separating funnel, followed by washing with water. The divinyl benzene (7.5 ml of 50-60% w/w in ethyl vinyl benzene) was treated similarly, and the monomers were then mixed and to the mixture 1.5g of benzoyl peroxide was added. This solution was then repidly added to a well-stirred aqueous solution of 1g potassium stearate in 200 ml water in the reaction vessel. This mixture was then maintained at 60° C. for eight hours, with constant stirring, under reflux and a slight positive pressure of nitrogen. (This is to exclude oxygen which inhibits the polymerization). At the end of this period, the mixture was cooled, and the solid removed and washed with water.

The solid was then resuspended in a 5:1 acetone: caustic soda mixture and heated under reflux in a waterbath for approximately 30 hrs. The solid, which had not apparently swelled or changed in appearance at all, was then recovered by decantation, washed several times by decantation with distilled water to remove fines and gummy material, and finally filtered and washed on the filter with more distilled water. The material was then resuspended in 1l of 3% aqueous caustic potash, and boiled under reflux with stirring for a further 20 hrs. It was again recovered and washed by decantation with distilled water; again no obvious change in its physical appearance was apparent. The material was then suspended in a 4:1 dilution of concentrated hydrochloric acid to water, and stirred with a fresh batch of acid for a further 4 hrs. It was finally thoroughly washed with distilled water and dried under vacuum. The material prepared by this sequence was a white, granular material, very similar in appearance to caster sugar. On drying, the water regain was 0.9 (g water/g weight of solid); as expected, the cross-linking had greatly reduced the water-holding ability of the material. The solid was milled for three hours, and a sample taken for density tests. At the end of this time, the material had been reduced in size to about twice the radius of starch, as judged under the microscope, ie about 10 microns particle radius. The density was 1.36, which should be compared with 1.42 for polyacrylic acid and 1.35 for polymethacrylic acid; as expected the introduction of the hydrocarbon monomer decreases the density. Unlike commercial polyacrylic acid, the cross-linked polymer was not soluble, and as a consequence, was not at all 'sticky'.

After milling overnight, the majority of the material had been reduced in size to about 3-5 microns (as judged under the microscope) although some coarser particles remained; the latter could be removed by rough sieving through bolting-cloth.

Static methods were used to investigate the E.V properties of the solid. A batch was dried down to an arbitrary level, and then a series of samples rehydrated under vacuum to known extents and tested as fluids at 30% by volume in Aroclor. Measurements made of the characteristic values for the fluid are given for each sample in Table 1.

Table 1

| Water added % by weight | $S/_{V\,(Pa/v)}$ | $V_{o\,(KV)}$ | $P^1$ | $Q^1$ |
|---|---|---|---|---|
| 1.3 | 1.95±0.17 | 1.68±0.29 | 0.66±0.51 | 0.62±0.20 |
| 3.2 | 2.14±0.11 | 0.61±0.10 | 0.49±0.23 | 3.43±0.12 |
| 5 | 1.58±0.08 | 0.29±0.07 | 0.62±1.67 | 23.6±1.21 |

[1] The units of P and Q are respectively amps/v × 7.87 × $10^6$ and amps/volt$^2$ × 7.87 × $10^9$.

A clear trend is established, in that a rise in water content is associated with a fall in $V_o$, a rise in the current passed, but only rather slight changes in $S/_V$. It is apparent that $V_o$ falls to useable values before the current becomes unacceptably high and therefore this solid would provide practically useful fluids.

No-field property measurements give a yield point of 92 Pa and a plastic viscosity of 0.22 Pa.s.

EXAMPLE 2

The procedure of Example 1 was repeated but using 135 ml of methyl acrylate with 15 ml (10%) of divinyl benzene (50–60% w/w in ethyl vinyl benzene). The product had a density of 1.34 and was a white granular material. After milling to 3–5 microns size, a fluid was made up in Aroclor (30% v/v) the water content of the polymer being 'ambient' + 6.2% by weight. The static test data obtained were as follows:

$S/_V = 1.38 \pm 0.07$ Pa/v
$V_o = 0.33$ KV
$P = 8.75 \pm 67.7$ amps/v × 7.87 × $10^6$
$Q = 23.56 \pm 100$ amps/v$^2$ × 7.87 × $10^9$ The no-field property values were: yield point: 33 Pa, plastic viscosity: 0.26 Pa.s.

EXAMPLE 3

142.5 ml of acrylic acid was mixed with divinyl benzene (7.5 ml) and benzoyl peroxide (2g) and the whole added to 1 Kg (530 ml) of Fomblin, vigorously stirred in a creased flask and maintained at 70° C. (It should be noted that it was not possible to easily remove the inhibitor (p.-methoxyphenol) from the acrylic acid; this was therefore 'swamped' by using a double quantity of benzoyl peroxide). As usual, nitrogen was passed over the surface of the reaction mixture to remove oxygen; the reaction vessel was provided with a thermometer and a reflux condenser.

After stirring the mixture for about an hour, the whole mass suddenly solidified, stopping the stirrer (it is essential to connect the latter to the drive motor by a slipping coupling to prevent breakage). The mass was allowed to cool, and lifted out above the reaction vessel and allowed to drain. The material was white and friable. With some difficulty, the polymer was removed from the stirrer, roughly broken up, and washed on a filter with trichlorotrifluoroethane (TCTFE). It was then exhaustively extracted in batches in a Soxhlet apparatus with the same solvent, finally being dried and milled.

It should be mentioned that roughly one third of the Fomblin had been entrained in the solid mass. After filtration, it was found that less than 10g. of Fomblin had been lost overall, a very satisfactory rate of recovery.

The solid was obtained as a pure white powder, density 1.37 (cf. the value of 1.36 for material produced in Example 1 by conventional procedure). When placed in water, there was some evidence of swelling; the initially hard particles swelled slightly, became more translucent and rubbery.

Following previous experiments, the solid was tested for E.V activity as a 30 percent suspension in Aroclor, after a known weight of solid had been allowed to pick up an amount of water equivalent to 3.5% by weight of the polymer. The static test results obtained are given below:

$S/_V = 1.90$ Pa/v
$V_o = 0.52$ KV
$P = 3.59 \pm 0.63$ amp/volt × 7.87 × $10^6$
$Q = 6.4 \pm 0.48$ amp/volt$^2$ × 7.87 × $10^9$

EXAMPLE 4

The procedure of Example 3 was repeated but using instead 148.5 ml of acrylic acid and 1.5 ml (1%) of the divinyl benzene solution. The product had a density of 1.39. Static test data was obtained for a 30% v/v solution in Aroclor of the product with 'ambient' water content, as follows:

$S/_V = 2.00 \pm 0.16$ Pa/v
$V_o = 0.48 \pm 0.18$ KV
$P = 0.44 \pm 0.82$ amp/volt × 7.87 × $10^6$
$Q = 13.30 \pm 0.58$ amp/volt$^2$ × 7.87 × $10^9$

EXAMPLE 5

Commercially available pure samples of polyacrylic and polymethacrylic acids were statically tested for E.V activity as fluids in 30% v/v Aroclor. The results obtained are given in Table 2. No field property data are also given for polymethacrylic acid.

Table 2

| Acid | Water Content | $S/_{v\,(Pa/v)}$ | $V_{o\,(KV)}$ | $P^1$ | $Q^1$ | Yield Point (Pa) | Plastic Viscosity (Pa.5) |
|---|---|---|---|---|---|---|---|
| polyacrylic | ambient | 3.63±0.31 | 0.75±0.19 | 2.33±0.20 | 1.89±0.10 | | |
| polymethacrylic | ambient | 2.13±0.02 | 1.03±0.05 | 0.45±0.11 | 1.27±0.05 | 58 | 0.33 |
| | ambient + 2.2% | 2.14±0.21 | 1.29±0.27 | −2.05±0.81 | 15.98±0.42 | | |
| | ambient + 3.7% | 2.17±0.08 | 0.27±0.06 | −9.00±7.32 | 2.00±5.4 | | |

[1] The units of P and Q are respectively amp/volt × 7.87 × $10^6$ and amp/volt$^2$ × 7.87 × $10^9$.

EXAMPLE 6 (COMPARATIVE)

Characteristic data for electroviscous fluids made with prior art solids are presented in Table 3, for comparison with the like data set out previously for fluids of the present invention. All measurements were made on 30% v/v suspensions in Aroclor.

Table 3

| Solid | SO | No Field yield point (Pa) | Properties plastic viscosity (Pa.s) | E.V. data S/$_V$ (Pa/V) | $V_o$ (KV) | P(amp/v × 7.87 × $10^6$) | Q(amp/$v^2$ × 7.87 × $10^9$) |
|---|---|---|---|---|---|---|---|
| Starch* | 1.54 | 51 | 0.16 | 0.99 ± 0.05 | 0.94 ± 0.13 | −10.12 ± 5.9 | 94.4 ± 3.2 |
| Alginic* acid | 1.64 | 34 | 0.27 | 2.2 ± 0.2 | 1.08 ± 0.2 | 0.41 ± 0.02 | 0.26 ± 0.01 |
| Polyvinyl + alcohol | 1.29 | 61 | 0.25 | 1.20 ± 0.18 | 0.44 ± 0.25 | 1.99 ± 0.24 | 1.79 ± 0.08 |

I claim:

1. An electroviscous fluid composition comprising in dispersion in an electrically non-conducting oleaginous vehicle, a water-containing solid phase, said solid phase consisting essentially of particles of a polymer containing acid groups, having a density of not greater than 1.8 and a water absorbency such that a sample thereof after being allowed to equilibrate with air containing water vapor, loses at least 8% of its weight when heated to constant weight at a temperature which does not cause decomposition of the polymer, and regains at least 40% of this loss in weight when exposed to air at an ambient relative humidity of about 60% and a temperature of 20° C.

2. An electroviscous fluid composition according to claim 1, wherein the acid group or groups are selected from the group consisting of carboxylic acid, sulphate and sulphonic acid groups.

3. An electroviscous fluid composition according to claim 1, wherein said polymer is an addition polymer.

4. An electroviscous fluid composition according to claim 3, wherein said addition polymer is derived from at least one monomer which contains at least one acid group and/or at least one group which is convertible to an acid group after polymerization of said monomer.

5. An electroviscous fluid composition according to claim 4, wherein said group convertible to an acid group is an ester group.

6. An electroviscous fluid composition according to claim 4, wherein said monomer is selected from the group consisting of acrylic and substituted acrylic acids.

7. An electroviscous fluid composition according to claim 6, wherein said monomer is methacrylic acid.

8. An electroviscous fluid composition according to claim 5, wherein said monomer is an alkyl acrylate.

9. An electroviscous fluid composition according to claim 8, wherein said monomer is selected from the group consisting of methyl acrylate and ethyl acrylate.

10. An electroviscous fluid composition according to claim 4, wherein a further monomeric constituent of the copolymer is provided by a member selected from the group consisting of an olefin, maleic acid, maleic anhydride, vinyl acetate and N-Vinyl pyrrolidone.

11. An electroviscous fluid composition according to claim 3, wherein the polymer is a cross-linked polymer.

12. An electroviscous fluid composition according to claim 11 wherein the polymer is chemically cross-linked by means of a substance selected from the group consisting of divinyl benzene and diallyl ether.

* * * * *